(12) United States Patent
Mukherjee et al.

(10) Patent No.: US 10,194,137 B1
(45) Date of Patent: *Jan. 29, 2019

(54) DEPTH-MAP GENERATION FOR AN INPUT IMAGE USING AN EXAMPLE APPROXIMATE DEPTH-MAP ASSOCIATED WITH AN EXAMPLE SIMILAR IMAGE

(71) Applicant: Google Inc., Mountain View, CA (US)

(72) Inventors: Debargha Mukherjee, Cupertino, CA (US); Chen Wu, Cupertino, CA (US); Meng Wang, Brookline, MA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,944

(22) Filed: Oct. 17, 2016

Related U.S. Application Data

(63) Continuation of application No. 13/478,449, filed on May 23, 2012, now Pat. No. 9,471,988.

(60) Provisional application No. 61/554,670, filed on Nov. 2, 2011.

(51) Int. Cl.
*H04N 13/261* (2018.01)
*G06T 7/40* (2017.01)
*G06T 7/00* (2017.01)
*H04N 13/128* (2018.01)

(52) U.S. Cl.
CPC ........... *H04N 13/261* (2018.05); *G06T 7/004* (2013.01); *G06T 7/408* (2013.01); *H04N 13/128* (2018.05); *G06T 2200/04* (2013.01)

(58) Field of Classification Search
None
See application file for complete search history.

(56) References Cited

U.S. PATENT DOCUMENTS

| 6,785,329 | B1 | 8/2004 | Pan et al. |
| 7,660,439 | B1 | 2/2010 | Lu et al. |
| 7,860,162 | B2 | 12/2010 | Yokomitsu et al. |
| 8,213,711 | B2 | 7/2012 | Tam et al. |

(Continued)

FOREIGN PATENT DOCUMENTS

| CN | 1466737 A | 1/2004 |
| DE | 10 2008 016553 | 11/2009 |
| WO | 2002013141 A1 | 2/2002 |

OTHER PUBLICATIONS

A. Saxena, S.H. Chung, and A. Ng. 3D-Depth Reconstruction from a Single Still Image. International Journal of Computer Vision (IJCV), 2007, 17 pages.

(Continued)

*Primary Examiner* — Sarah Lee
(74) *Attorney, Agent, or Firm* — Lowenstein Sandler LLP

(57) ABSTRACT

A two-dimensional image to be converted to a first three-dimensional image may be received. A second three-dimensional image that is visually similar to the two-dimensional image that is to be converted may be identified. A feature-to-depth mapping function may be computed for the first three-dimensional image by using an approximate depth map of the second three-dimensional image that is visually similar to the two-dimensional image that is to be converted. The feature-to-depth mapping function may be applied to a plurality of pixels of the two-dimensional image to determine a depth value for the plurality of pixels of the two-dimensional image. The first three-dimensional image may be generated based on the depth values for the plurality of pixels of the two-dimensional image.

18 Claims, 11 Drawing Sheets

(56) References Cited

U.S. PATENT DOCUMENTS

| | | |
|---|---|---|
| 8,249,333 B2 | 8/2012 | Agarwal et al. |
| 8,330,801 B2 | 12/2012 | Wang et al. |
| 8,411,931 B2 | 4/2013 | Zhou et al. |
| 8,421,847 B2 | 4/2013 | Hsiao |
| 8,488,868 B2 | 7/2013 | Tam et al. |
| 8,531,507 B2 | 9/2013 | Provitola |
| 8,644,596 B1 | 2/2014 | Wu et al. |
| 8,666,146 B1 | 3/2014 | Smolic et al. |
| 8,953,874 B2 | 2/2015 | Wu et al. |
| 9,380,283 B2 | 6/2016 | Ko et al. |
| 9,478,196 B2 | 10/2016 | Liu |
| 2002/0048395 A1 | 4/2002 | Harman et al. |
| 2002/0191841 A1 | 12/2002 | Harman |
| 2005/0053276 A1 | 3/2005 | Curti et al. |
| 2005/0104964 A1 | 5/2005 | Bovyrin et al. |
| 2006/0187345 A1 | 8/2006 | Soto et al. |
| 2006/0274302 A1 | 12/2006 | Shylanski et al. |
| 2007/0024614 A1 | 2/2007 | Tam et al. |
| 2007/0047809 A1 | 3/2007 | Sasaki |
| 2007/0146232 A1 | 6/2007 | Redert et al. |
| 2008/0199044 A1 | 8/2008 | Tsurumi |
| 2009/0003687 A1 | 1/2009 | Agarwal et al. |
| 2009/0116732 A1 | 5/2009 | Zhou et al. |
| 2009/0185029 A1 | 7/2009 | Mitsuhashi et al. |
| 2009/0238462 A1 | 9/2009 | Feris et al. |
| 2009/0310828 A1 | 12/2009 | Kakadiaris et al. |
| 2009/0322860 A1 | 12/2009 | Zhang et al. |
| 2010/0080448 A1 | 4/2010 | Tam et al. |
| 2010/0208986 A1 | 8/2010 | Cobb et al. |
| 2010/0215251 A1 | 8/2010 | Klein Gunnewiek et al. |
| 2010/0316257 A1 | 12/2010 | Xu et al. |
| 2011/0026808 A1 | 2/2011 | Kim et al. |
| 2011/0026840 A1 | 2/2011 | Tao et al. |
| 2011/0043540 A1 | 2/2011 | Fancher et al. |
| 2011/0050853 A1 | 3/2011 | Zhang et al. |
| 2011/0096832 A1 | 4/2011 | Zhang et al. |
| 2011/0122126 A1 | 5/2011 | Han et al. |
| 2011/0150287 A1 | 6/2011 | Flosdorf et al. |
| 2011/0181588 A1 | 7/2011 | Barenbrug et al. |
| 2011/0210969 A1 | 9/2011 | Barenbrug |
| 2011/0242279 A1 | 10/2011 | Redert et al. |
| 2011/0255775 A1 | 10/2011 | McNamer et al. |
| 2011/0293248 A1 | 12/2011 | Toma et al. |
| 2012/0013711 A1 | 1/2012 | Tamir et al. |
| 2012/0214463 A1 | 8/2012 | Smith et al. |
| 2012/0293624 A1 | 11/2012 | Chen et al. |
| 2013/0106837 A1 | 5/2013 | Mukherjee et al. |
| 2013/0147911 A1 | 6/2013 | Karsch et al. |
| 2013/0176445 A1 | 7/2013 | Streeter et al. |
| 2013/0215239 A1 | 8/2013 | Wang et al. |

OTHER PUBLICATIONS

A. Saxena, M. Sun, and A.Ng. Make3D: Learning 3D Scene Structure from a Single Still Image. IEEE Transactions on Pattern Analysis and Machine Intelligence (TPAMI), 2008, 16 pages.

A. Torralba, R. Fergus, W.T. Freeman, "80 million tiny images: a large dataset for non-parametric object and scene recognition", IEEE Transactions on Pattern Analysis and Machine Intelligence, vol. 30(11), 2008, 14 pages.

Brox et al., "High Accuracy Optical Flow Estimation Based on a Theory for Warping." European Conference on Computer Vision (ECCV), 2004, 12 pages.

Fehn, C., "Depth-image-based rendering (DIBR), compression, and transmission for a new approach on 3D-TV," Sterioscopic Displays and Virtual Reality Systems XI., vol. 5291, pp. 93-104, May 2004, 12 pages.

Grundmann et al., Auto-Directed Video Stabilization with Robust L1 Optimal Camera Paths. IEEE Conference on Computer Vision and Pattern Recognition (CVPR), 2011, 8 pages.

Khan, et al. "Image-based material editing," ACM Transactions on Graphics, vol. 25, No. 3, pp. 654-663, Proceedings of the ACM SIGGRAPH conference, 2006. Section: 2.1, 10 pages.

Langer et al. "Depth Discrimination from shading under diffuse lighting." Perception vol. 29, pp. 649-660, 2000, 12 pages.

M. Gullmann, L. Wolf, and D. Cohen-Or. Semi-Automatic Stereo Extraction From Video Footage. IEEE International Conference on Computer Vision (ICCV), 2009, 8 pages.

M. Liao, J. Gao, R. Yang, and M. Gong. Video Stereolization: Combining Motion Analysis with User Interaction. IEEE Transactions on Visualization and Computer Graphics (TVCG), 2011, 23 pages.

Zhang et al., "Shape from shading: a survey." IEEE Transactions on Pattern Analysis and Machine Intelligence 21, 8, 690, 1999, 17 pages.

Zhang et al., "Consistent Depth Maps Recovery from a Video Sequence". IEEE Transactions on Pattern Analysis and Machine Intelligence (TPAMI), 31 (6): 974-988, 2009, 15 page.

Sergey Weinstein, 3-D Stereoscopic Reconstruction using Structured Light, May 19, 2006, http://cslab1.bc.edu/-csacademics/pdf/06SergeyWeinstein.pdf, 21 pages.

USPTO; Office Action for U.S. Appl. No. 13/370,736, dated Oct. 31, 2013, 27 pages.

USPTO; Office Action for U.S. Appl. No. 13/370,736, dated Apr. 17, 2014, 29 pages.

USPTO; Office Action for U.S. Appl. No. 13/370,736, dated Aug. 11, 2014, 36 pages.

USPTO; Office Action for U.S. Appl. No. 13/370,736, dated Jan. 28, 2015, 29 pages.

USPTO; Office Action for U.S. Appl. No. 14/805,326, dated Aug. 25, 2015, 32 pages.

USPTO; Office Action for U.S. Appl. No. 14/805,326, dated Mar. 15, 2016, 27 pages.

USPTO; Office Action for U.S. Appl. No. 13/478,449, dated Oct. 4, 2013, 18 pages.

USPTO; Office Action for U.S. Appl. No. 13/478,449, dated Mar. 10, 2014, 24 pages.

USPTO; Office Action for U.S. Appl. No. 13/478,449, dated Aug. 11, 2014, 26 pages.

USPTO; Office Action for U.S. Appl. No. 13/478,449, dated Jan. 28, 2015, 29 pages.

USPTO; Notice of Allowance for U.S. Appl. No. 13/478,449, dated Feb. 11, 2016, 9 pages.

USPTO; Office Action for U.S. Appl. No. 13/632,489, dated Jan. 29, 2015, 10 pages.

USPTO; Office Action for U.S. Appl. No. 13/632,489, dated Jun. 8, 2015, 16 pages.

USPTO; Office Action for U.S. Appl. No. 13/632,489, dated Dec. 15, 2015, 12 pates.

USPTO; Notice of Allowance for U.S. Appl. No. 13/527,415, dated Sep. 27, 2013, 10 pages.

USPTO; Office Action for U.S. Appl. No. 14/170,335, dated May 5, 2014, 7 pages.

USPTO; Notice of Allowance for U.S. Appl. No. 14/170,335, dated Oct. 8, 2014, 5 pages.

USPTO; Notice of Allowance for U.S. Appl. No. 13/478,449, dated Jun. 14, 2016, 7 pages.

USPTO; Office Action for U.S. Appl. No. 13/840,623, dated Apr. 8, 2015, 6 pages.

USPTO; Office Action for U.S. Appl. No. 13/840,623, dated Sep. 10, 2015, 7 pages.

USPTO; Office Action for U.S. Appl. No. 13/840,623, dated Jan. 19, 2016, 7 pages.

International Search Report and Written Opinion for PCT/US2012/063435, dated Dec. 27, 2012, 15 pages.

Preliminary Report on Patentability for PCT/US2012/063435, dated May 6, 2014, 6 pages.

USPTO; Notice of Allowance for U.S. Appl. No. 13/370,736, dated Apr. 14, 2015, 7 pages.

USPTO; Final Office Action for U.S. Appl. No. 13/840,623, dated Aug. 10, 2016, 10 pages.

Extended European Search Report for E.P. Application No. 12845015.2-1902 / 2774124, dated Sep. 17, 2015, 8 pages.

B. Liu, S. Gould, D. and Koller. Single Image Depth Estimation From Predicted Semantic Labels. IEEE Conference on Computer Vision and Pattern Recognition (CVPR), 2010, 8 pages.

(56) References Cited

OTHER PUBLICATIONS

USPTO; Office Action for U.S. Appl. No. 13/478,449, dated Sep. 16, 2015, 24 pages.
USPTO; Office Action for U.S. Appl. No. 13/478,449, dated Jun. 10, 2015, 21 pages.
USPTO; Office Action for U.S. Appl. No. 13/632,489, dated Jun. 23, 2016, 16 pages.
USPTO; Office Action for U.S. Appl. No. 14/805,326, dated Jun. 22, 2016, 31 pages.

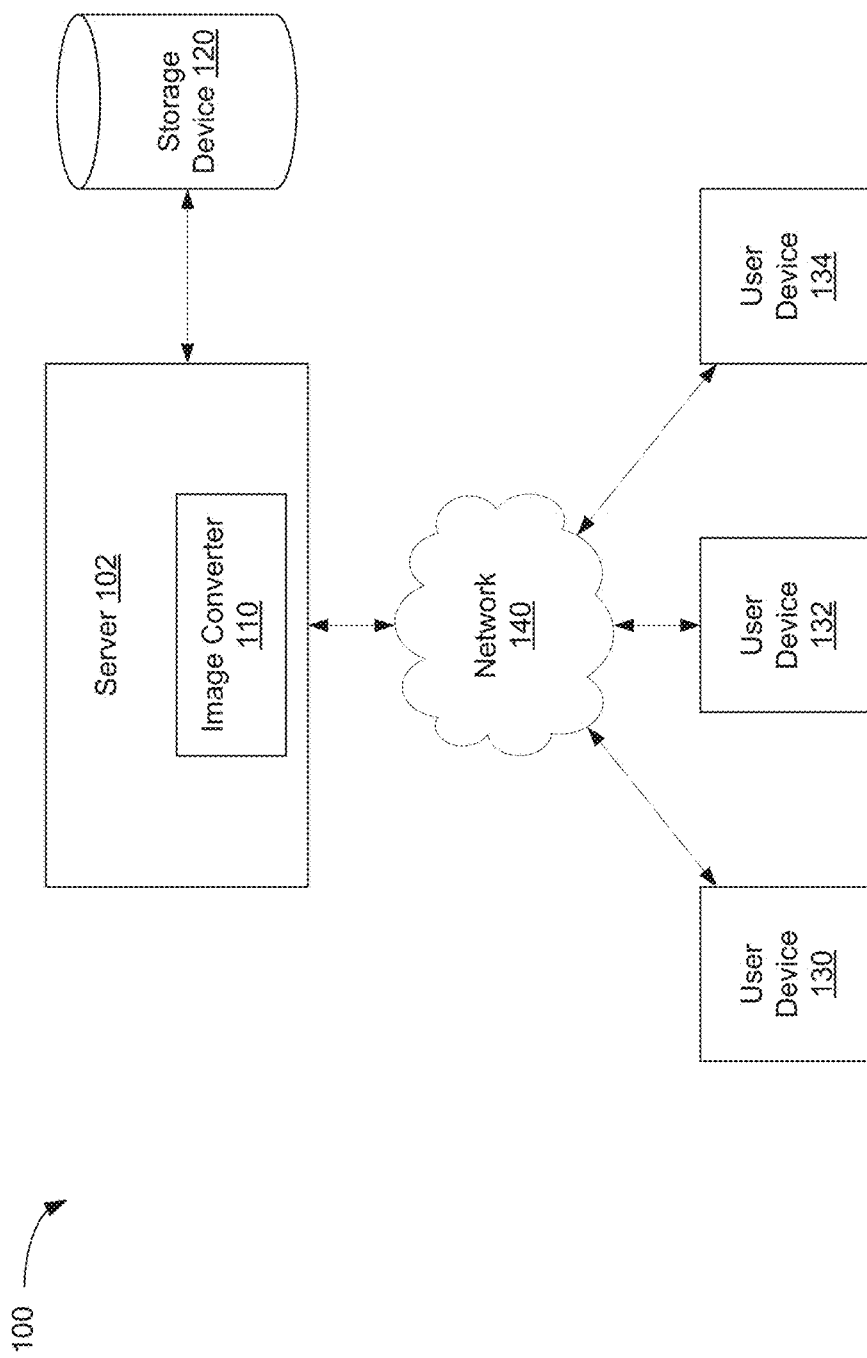

DEPTH-MAP GENERATION FOR AN INPUT IMAGE USING AN EXAMPLE APPROXIMATE DEPTH-MAP ASSOCIATED WITH AN EXAMPLE SIMILAR IMAGE

RELATED APPLICATIONS

This continuation application claims priority to U.S. patent application Ser. No. 13/478,449 filed on May 23, 2012 which is related to and claims the benefit of U.S. Provisional Patent Application No. 61/554,670, filed Nov. 2, 2011, all of which are hereby incorporated by reference herein.

TECHNICAL FIELD

This disclosure relates to the field of image processing and, in particular, to conversion of monoscopic visual content to stereoscopic 3D.

BACKGROUND

Advances in display technology have caused display devices capable of conveying a stereoscopic perception of three-dimensional (3D) depth to a view to become increasingly common. These 3D displays may be found in high-definition (HD) television sets, gaming devices, and other computing devices. The growing number of 3D displays has led to a need for additional 3D visual content (e.g., images, video). Conventionally, creating 3D content has been a difficult and time consuming process. A content creator, for example, would capture a subject using two cameras, combine the video or images from each camera, and use special software to make the 3D effect look accurate. This typically includes a lengthy, highly technical and expensive manual process. Further, conventional techniques for converting two-dimensional (2D) images and video to 3D may not be scalable given the time and resources it would require to convert a large number of images or video. In addition, conventional techniques are limited to converting specific types of images and video and may not be used for general 2D to 3D conversion tasks.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, an image converter receives a two-dimensional image to be converted to a first three-dimensional image. The image converter computes a feature-to-depth mapping function based on an approximate depth map associated with a second three-dimensional image. The image converter applies the feature-to-depth mapping function to a plurality of pixels of the two-dimensional image to determine a depth value for each of the plurality of pixels and generates the first three-dimensional image based on the depth values for the plurality of pixels of the two-dimensional image.

In one implementation, a method includes receiving a two-dimensional image to be converted to a first three-dimensional image; computing, a feature-to-depth mapping function based on an approximate depth map associated with a second three-dimensional image; applying the feature-to-depth mapping function to a plurality of pixels of the two-dimensional image to determine a depth value for each of the plurality of pixels; and generating the first three-dimensional image based on the depth values for the plurality of pixels of the two-dimensional image.

BRIEF DESCRIPTION OF THE DRAWINGS

The present disclosure is illustrated by way of example, and not by way of limitation, in the figures of the accompanying drawings.

FIG. 1 is a block diagram illustrating an exemplary network architecture in which aspects of the present disclosure may be implemented.

DETAILED DESCRIPTION

Figure 2A:
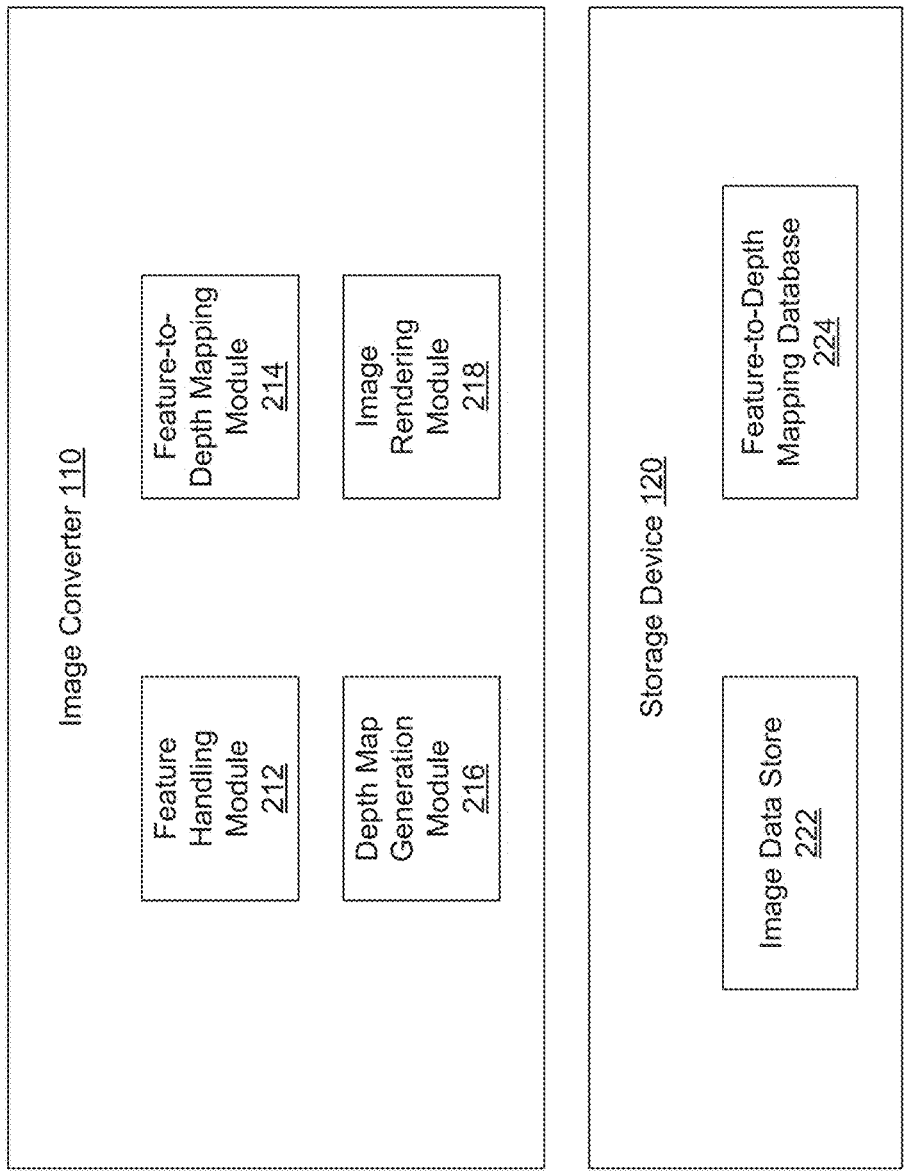
FIG. 2A is a block diagram illustrating an image converter for depth map generation using an approximate depth map associated with an example similar image, according to an implementation.

Implementations are described for generating a depth map for a two-dimensional (2D) input image. The depth map may be used to convert the 2D input image into a three-dimensional (3D) output image. The 2D input image may be provided by a user or selected from a database of available images. The image converter described herein may have access to another database storing 3D images. These 3D images may have been captured initially in 3D or may have been previously converted from 2D to 3D. The image converter can identify a 3D example image from the database that is visually similar to the 2D input image. The visually similar image may share a number of features with the 2D input image, such as similar colors, similar subject matter, may be taken in a similar location, etc. While details are provided herein specifically relating to images as an example for clarity of explanation, it shall be appreciated that such details may be equally applicable to other types of media, e.g., video, documents, text (e.g., tweets), flash-content, etc., as applicable.

Since the visually similar example image is a 3D image, depth information may be known for the image. If the depth information is not known or readily available, it may be computed using depth interpolation techniques. The depth information may be stored in the form of a depth map. The depth map can include a depth value for each pixel in the 3D example image that is used to render the 3D effects for the image. Since the depth map is associated with the 3D example image, it will not be directly related to the 2D input image. Thus, the depth map may be referred to as an approximate depth map in relation to the 2D input image. However, since the 3D example image is visually similar to the 2D input image, the approximate depth map can be a good starting point for generating a final depth map for the 2D input image.

Using the 3D example image and the approximate depth map, in one implementation, the image converter can generate a feature-to-depth mapping function that relates a feature value, such as color, of each pixel or group of pixels in the 3D example image to a depth value. The image converter can apply this function to the known feature values of the 2D input image to generate a depth value for each pixel of the 2D input image. These depth values can form the final depth map for the 2D input image. Using the final depth map, the image converter can render a 3D output image based on the 2D input image. Thus, the 2D input image can be efficiently converted to a 3D output image.

Implementations of the conversion techniques described herein provide for fully automatic conversion of 2D visual content to 3D. This can allow an individual to avoid the costly and time-intensive processes of capturing a 3D image or manually converting an existing 2D image to 3D. The use of a feature-to-depth mapping function, which corresponds to images that are visually similar to the input image, allows for a more accurate prediction of the depth values for the image. In turn, this can lead to a more accurate and realistic rendering of the 3D output image. In addition, utilizing a large database of images for the comparison increases the possibility that a visually similar image or images can be found, facilitating the conversion of many types of visual content. In one implementation, millions of images are available for comparison.

FIG. 1 is a block diagram illustrating an exemplary network architecture in which aspects of the present disclosure may be implemented. The network architecture 100 can include one or more servers 102 communicating with one or more user devices 130, 132, 134 over one or more networks 140, according to one implementation. Network 140 can be a local area network (LAN), a wireless network, a telephone network, a mobile communications network, a wide area network (WAN), such as the Internet, or similar communication system. User devices 130, 132, 134 may be any type of computing device including server computers, gateway computers, desktop computers, laptop computers, mobile communications devices, cell phones, smart phones, hand-held computers, tablets, or similar computing devices. The user devices 130, 132, 134 can be variously configured with different features to enable viewing of visual content, such as images, videos, etc.

Server 102 can include a network-accessible server-based functionality, various data stores, and/or other data processing equipment. The server 102 can be implemented by a single machine or a cluster of machines. Server 102 can include, for example, computer system 900 of FIG. 9. In one implementation, server 102 includes image converter 110 and storage device 120. In another implementation, storage device 120 may be external to server 102 and may be connected to server 102 over a network or other connection. In other implementations, server 102 can include different and/or additional components which are not shown here so as not to obscure the present disclosure. Storage device 120 can include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

In one implementation, storage device 120 includes an image data store including a number of 3D images as well as a number of 2D images or videos. For at least some of the 2D or 3D images, an associated depth map may also be stored in storage device 120. In one implementation, the depth map includes a depth value for each pixel (or each group of pixels) in the image. In another implementation, for each of the 3D images, a feature-to-depth mapping database, which includes a predetermined feature-to-depth mapping function, can be provided and stored in storage device 120.

Image converter 110 can receive a user request to convert a 2D input image to a 3D output image. The 2D input image to be converted can be an image previously provided by a user or a computer application program and stored in storage device 120 or an image provided by the user along with the request. Image converter 110 can identify a 3D example image (or images) that is visually similar to the 2D image being converted, and an approximate depth map associated with the example image. The example similar image and the associated approximate depth map can be stored in storage device 120. The visually similar 3D example image may be identified by the features that it shares with the 2D input image, such as similar colors, subject matter, location, context, etc. The approximate depth map can include a depth value for each pixel (or group of pixels) in the 3D example image that is used to render the 3D effects for the image. In another implementation, the approximate depth map may not be associated with the 3D example image, but rather may be otherwise selected by the user or by image converter 110 from a selection of available depth maps for use in converting the 2D input image to 3D. As will be described below, image converter 110 can use the approximate depth map to automatically convert the 2D input image into a 3D output image.

FIG. 2A is a block diagram illustrating an image converter for depth map generation using an approximate depth map associated with an example similar image, according to an implementation of the present disclosure. In one implementation, image converter 110 can include feature handling module 212, feature-to-depth mapping module 214, depth map generation module 216 and image rendering module 218. This arrangement of modules may be a logical separation, and in other implementations, these modules or other components can be combined together or separated into further components, according to a particular implementation. In one implementation, storage device 120 can include image data store 222 and feature-to-depth mapping database 224 that are used by image converter 110 for more accurate 2D to 3D conversion.

Image converter 110 can receive a 2D input image (e.g., from a user or a computer application program) that is to be converted to a 3D output image and can find an example similar image in data store 222 and an associated approximate depth map. In one implementation, a threshold is defined, such as a number of features or characteristics that must be shared between the input image and an image from data store 222, to consider the image from data store 222 to be similar to the input image being converted. Once the similar image is identified, a feature-to-depth mapping function for the 3D similar image is determined using the approximate depth map associated with the similar image. In another implementation, the feature-to-depth mapping function may be determined for the 3D similar image ahead of time and stored in feature-to-depth mapping database 224.

In one implementation, the feature-to-depth mapping function is determined by feature handling module 212 and feature-to-depth mapping module 214. In particular, in one implementation, each 3D image (or frame of a 3D video) in image data store 222 includes or is associated with a stereo image pair which, when viewed, creates an illusion of depth. Generally, the image pair includes two images (e.g., left image and right image) of the same subject, taken from slightly different viewpoints (roughly equal to the distance between a person's eyes). Thus, each point in the two images will have a slight offset (measured in pixels) that is proportional to the distance the point is from the viewpoint. This offset may be referred to as disparity. In one implementation, the depth value for each pixel in the approximate depth map associated with the 3D example image may be equal to or proportional to the calculated disparity.

In order to generate the feature-to-depth mapping function for the 3D example image, features of the 3D example image may be related to the depth values in the approximate depth map. In one implementation, feature handling module 212 can identify one or more features of the 3D example image from image data store 222. In one implementation, the feature may include a color value of each pixel in the example image. In other implementations, some other feature may be used such as motion (or associated motion vector), location, texture, edge, or gradient histogram based on image features such as scale-invariant feature transform (SIFT). The feature-to-depth mapping described herein may be used with any of these or other features.

In one implementation, feature handling module 212 can determine a number of bins in a color space (e.g., YUV, RGB, YCbCr). Binning may be used to reduce the number of colors taken into account. YUV, for example may have a 24 bit color value, which may be too large for a typical feature-to-depth mapping function. Thus, feature handling module 212 can combine different color values to have a manageable number of bins. For the example image from image data store 222, feature handling module 212 can associate each pixel with an appropriate bin based on the color value of the pixel. Using the approximate depth map, feature handling module 212 can also combine (e.g., average) the depth values for each pixel in a certain bin to generate an aggregate depth value for the bin. A similar combination may be performed for the colors in each of the remaining bins, until a series of data points are obtained.

Feature-to-depth mapping module 214 can generate a feature-to-depth mapping function for the example image based on one or more features of the image and the depth values determined by feature handling module 212. In one implementation, the feature used to generate the function may be color. Each pixel of the example image has a known color value (e.g., determined from the image metadata) and may have a depth value determined for each color bin by feature handling module 212. The feature-to-depth mapping function can aggregate the depth values for pixels of the same or similar colors, based on the assumption that objects in the image having the same or similar color will also have a same or similar depth value. In other implementations, other features may be used to generate the feature-to-depth mapping function, either in place of or in addition to color, such as texture, location, shape, etc. The resulting function can ultimately receive a color value (or other feature value) for a certain pixel or other point as an input, and output a depth value for that pixel. Additional details of the feature-to-depth mapping function are described below with respect to FIG. 4.

Figure 2B:
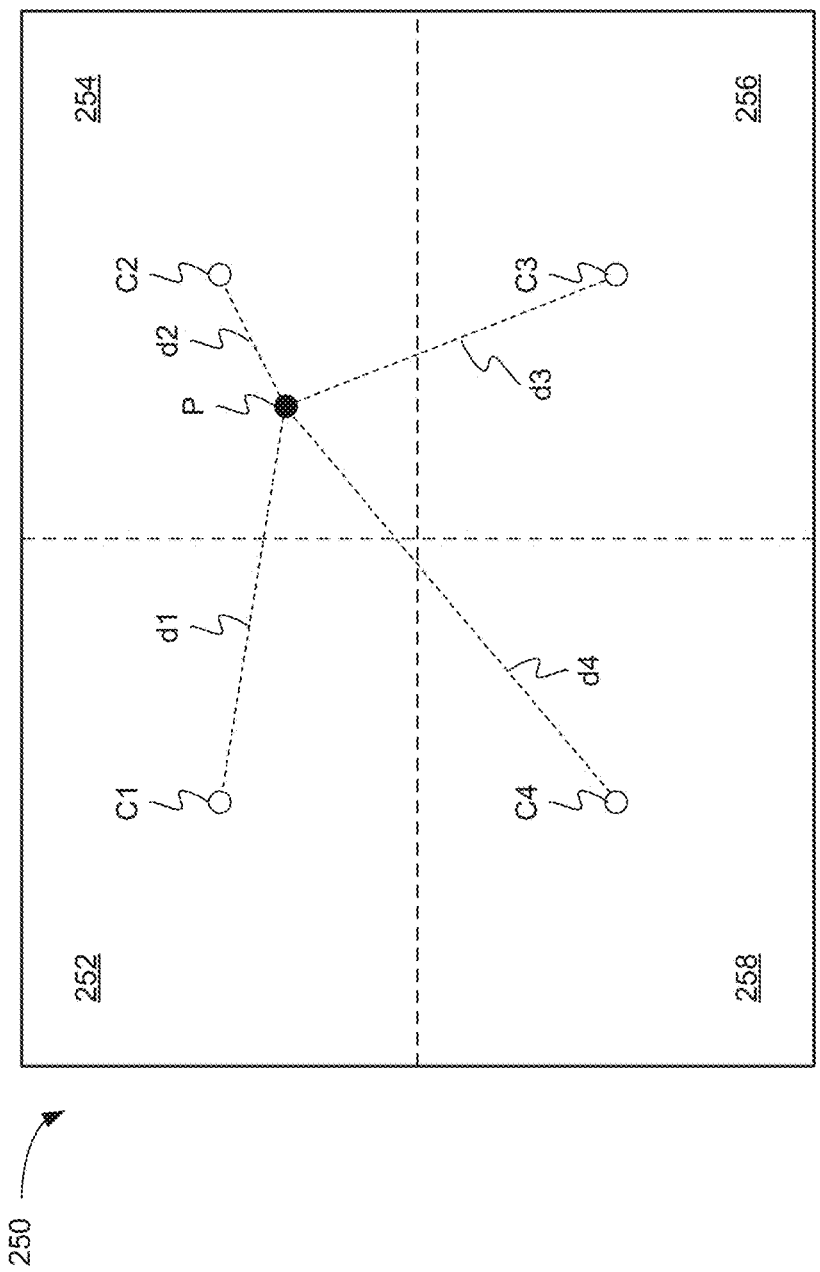
FIG. 2B is a diagram illustrating an image divided into regions for feature-to-depth mapping, according to an implementation.

In one implementation, rather than generating just one feature-to-depth mapping function for the 3D example image, feature-to-depth mapping module 214 can generate multiple feature-to-depth mapping functions for a single example image in image data store 222. Different functions may be generated, for example, for different regions of the image. In one implementation, an image from image data store 222 may be logically divided into a number of regions (e.g., two, four). The image can be tiled in different ways, depending on distribution of the major spatial variation in the image. For example, for an outdoor mountain-sky image, it may be sufficient to divide the image horizontally into two parts, the top and the bottom half image. For an indoor image, it may be better to have more spatial components, where the left vs. right half images may have different depth mapping as well. FIG. 2B is a diagram illustrating an example image 250, logically divided into four equal regions 252-258. Feature-to-depth mapping module 214 can treat each region 252-258 as its own individual image and determine a feature-to-depth mapping function specific to that region in the manner described above. In one implementation, feature-to-depth mapping module 214 can store the multiple functions corresponding to the regions of the image in database 224. In another implementation, the multiple functions may be combined (e.g., using a linear combination based on the distance from a pixel P to the center of each region C1-C4) into a single function that is stored in database 224 for example. The linear combination may eliminate potential "boundary effects" generated by switching feature-to-depth mapping functions across the different regions. When applying the feature-to-depth mappings to the 2D input image, the final depth value may be an interpolation between the different regions. When computing the depth value for a pixel P, its distance to the centers C1-C4 of the regions are first computed, and may be denoted as d1, d2, d3 and d4. With feature-to-depth mapping of region 252, it gives a depth value v1 for pixel P. Similarly, we get v2, v3 and v4 with feature-to-depth mapping from other regions 254-258. The final depth value of P may be calculated by combining v1 thru v4 which is inversely-proportional to d1 thru d4; e.g., depth of P=(v1/d1+v2/d2+v3/d3+v4/d4)/(1/d1+1/d2+1/d3+1/d4).

Upon completion of generating the feature-to-depth mapping function, the feature-to-depth mapping function for the image from image data store 222 can be stored in a corresponding entry in feature-to-depth mapping database 224. In one implementation, feature-to-depth mapping database 224 can have some other structure besides a database (e.g., a list of key-value pairs). In one implementation, feature-to-depth mapping database 224 can be a separate data structure (as shown), however in other implementations, the mapping information may be stored in the metadata of image data store 222. Image converter 110 can use the feature-to-depth mapping database 224 to automatically generate a 3D output image from a 2D input image.

Figure 5:
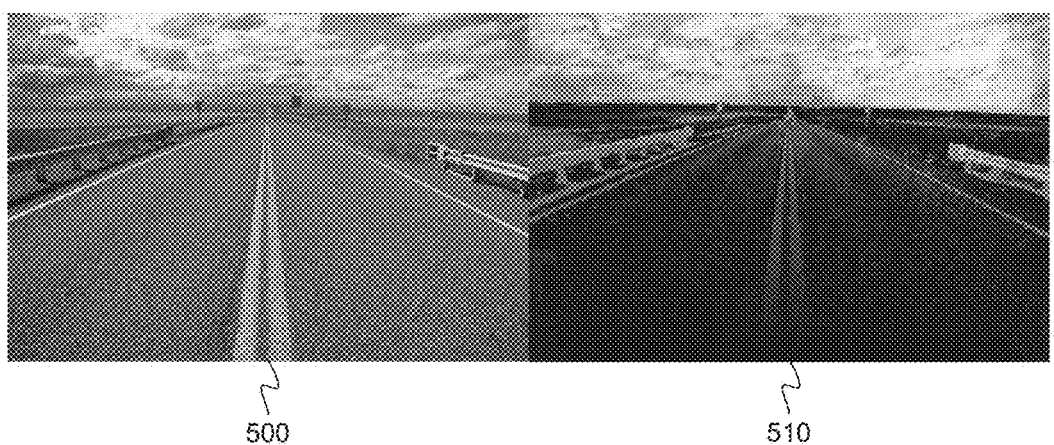
FIG. 5 is a diagram illustrating a depth map computed according to an implementation.

In one implementation, depth map generation module 216 can compute a depth map for the 2D input image based on the feature-to-depth mapping function determined by feature-to-depth mapping module 214. Image data and/or metadata received with the input image may include, for example, a color value associated with each pixel in the input image. A depth value can then be calculated for each pixel by applying the color values (or other appropriate feature values) as inputs to the feature-to-depth mapping function which was generated based on the 3D example image and the approximate depth map. Depth-map generation module 216 can perform the calculations to make this determination and can store the resulting depth values (e.g., a final depth map) in storage device 120. An example of one resulting depth map 510 is shown in FIG. 5.

Image rendering module 218 can render a 3D output image (i.e., a stereo image pair) based on the input image and the depth values calculated by depth map generation module 216. In one implementation, rendering module 218 uses depth image based rendering (DIBR) techniques to generate the 3D image. DIBR techniques can render a 2D image based on another 2D image and a per pixel depth map. The original 2D image becomes one of two views that make up a 3D image, while the DIBR-rendered 2D image becomes the second view. In one implementation, the original 2D image is the left view, while the rendered 2D image is the right view. In other implementations, this may be reversed.

As an example, given the per-pixel depth map, a displacement map may be generated indicating how much each pixel should move from the left view to the right view. The relationship between depth and displacement may be approximately linear; however, some parameters may be adjusted in order to control how much an object "pops out" of a screen or how much it appears to extend behind the screen. Once the displacement map is generated, the pixels may be shifted from the left view to the right view to render the right view, while making sure that pixels which are in front occlude pixels in the back, if multiple pixels from the left view map to the same pixel in the right rendered image space. Once all the pixels have been shifted, there may still be some holes left in the rendered right view. An in-painting (image interpolation) technique may be employed to fill up the holes from the neighboring pixels in the rendered image. This yields the final rendered right view. In order to create high quality rendering, the rendering may be conducted in an intermediate higher resolution pixel grid by interpolating based on the left view and the per-pixel depth map. Once the rendered image is obtained at the higher intermediate resolution, it can be scaled back to the desired resolution. In one implementation, the rendered image may be filtered using, for example, cross bilateral filtering. Cross bilateral filtering is a way to filter an image with respect to the geometry of objects in the image. For example, when an image is filtered, a pixel value may be combined with values from the neighborhood of the pixel to remove aliasing, noise, and other undesirable features. This may result in averaging values that possibly do not belong to the same object in the image, and thus can lead to incoherent values. Cross bilateral filtering tries to solve this by using multiple source images (instead of just one) to help identify objects. As a result, when filtering, the neighborhood pixel values may be weighted by their screen space distance, and also using an expression that takes into account a depth difference to determine if both pixels belong to the same object. This may help to prevent blurring in the resulting filtered image.

Figure 3:
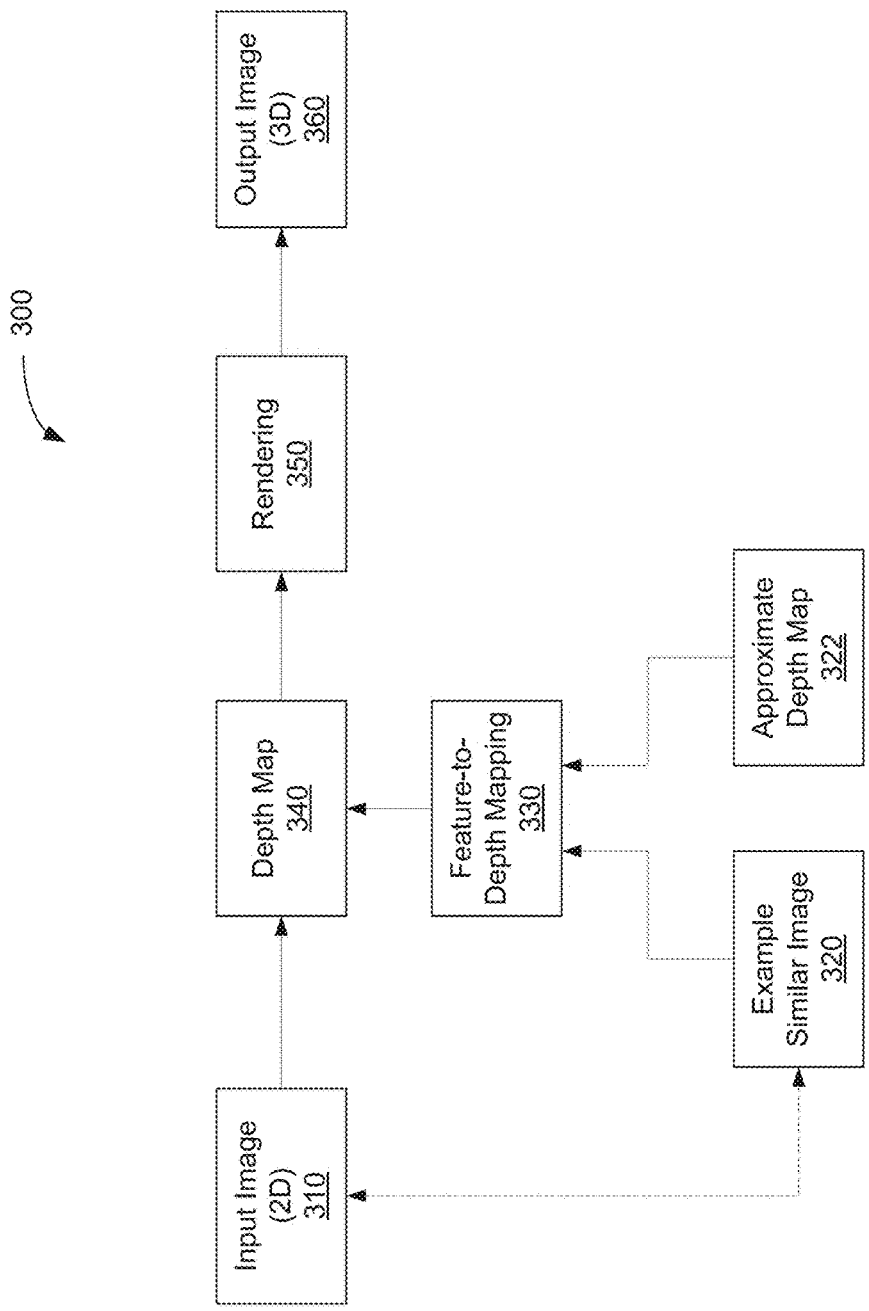
FIG. 3 is a block diagram illustrating an image conversion processing flow, according to an implementation.

FIG. 3 is a block diagram illustrating an image conversion processing flow, according to an implementation of the present disclosure. The various modules and components may be described in regards to their roles in generating a depth map for an input image using an approximate depth map associated with an example similar image.

In one implementation, the processing flow 300 begins with receiving a 2D input image at block 310. At block 320, an example similar image is identified. At block 322 an approximate depth map is identified. The approximate depth map may be associated with the example similar image or may be associated with some other visually similar image. At block 330, a feature-to-depth mapping function is determined for the example image. Feature-to-depth mapping module 214 can determine a feature-to-depth mapping function for the example similar image based on features of the example similar image 320 and the approximate depth map 322. At block 340, a depth map is generated for the input image based on the feature-to-depth mapping function. Depth map generation module 216 can generate the depth map by applying a feature value (e.g., color) for each pixel in the input image to the feature-to-depth mapping function to determine the depth values. At block 350, the depth map may be used with rendering techniques (e.g., DIBR) to generate the 3D output image 360.

For simplicity of explanation, the flows and methods of this disclosure are depicted and described as a series of acts. However, acts in accordance with this disclosure can occur in various orders and/or concurrently, and with other acts not presented and described herein. For example, identifying the approximate depth map at block 322 and feature-to-depth mapping at block 330 associated with the example similar image can occur before the input image is received at block 310 and stored, e.g., in storage device 120. Once the example similar image is identified at block 320, the pre-processed approximate depth map and feature-to-depth mapping function can be retrieved and used to generate the depth map at block 340.

Figure 4:
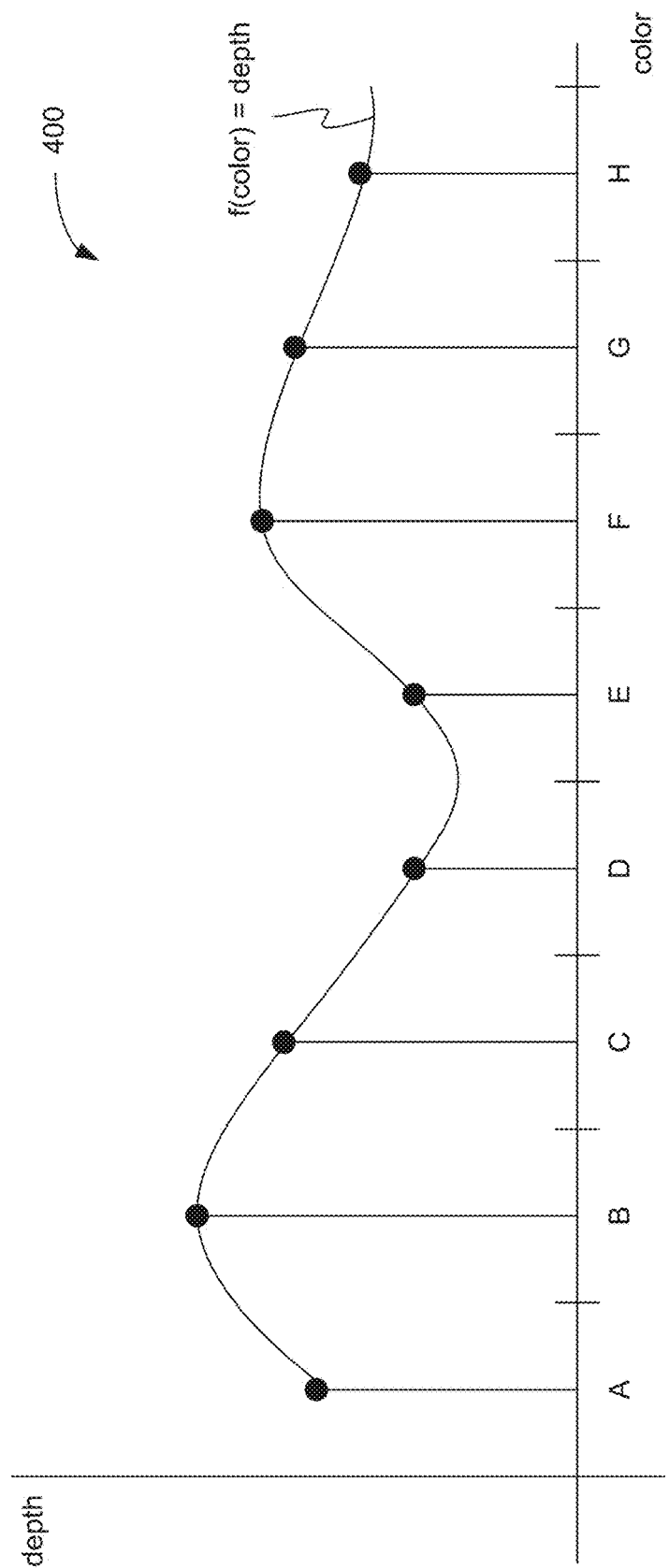
FIG. 4 is a diagram illustrating a feature-to-depth mapping function, according to an implementation.

FIG. 4 is a diagram illustrating a feature-to-depth mapping function, according to an implementation of the present disclosure. In this implementation, the feature-to-depth mapping function 400 is based on the color of each pixel in an image. The function 400 can receive a color value for a certain pixel or other point as an input and output a depth value for that pixel. FIG. 4 illustrates depth as a function of color in one dimension for ease of understanding. One of skill in the art would recognize that in practice, the function could illustrate similar properties in a multi-dimensional color space (e.g., YUV, RGB). In one implementation, binning is used to reduce the number of colors taken into account by the function. YUV, for example may have a 24 bit color value, which may be larger than desired for a typical feature-to-depth mapping function. In some cases the over 16 million different colors represented in a 24-bit color scheme may make computing a color-to-depth mapping function too computationally expensive and time consuming. In FIG. 4, the color values have been reduced to eight bins (A-H), although in other implementations, some other number may be used. For one of the images in image data store 222, for which the color values and depth values are known, the depth values corresponding to each pixel having one of the colors in a certain bin (e.g., bin A) are combined (e.g., averaged) to generate an aggregate depth value. This value may be stored as part of function 400. A similar combination may be performed for the colors in each of the remaining bins, until a series of data points are obtained. Feature-to-depth mapping module 214 can perform a form of polynomial fit (e.g., curve fitting) to generate the feature-to-depth mapping function 400. The resulting function may be expressed as f(color)=depth, or in the case of YUV color, f(YUV)=depth. Thus, the depth value for a given pixel can be computed as a function of the YUV color values for that pixel. The function 400 may be stored in feature-to-depth mapping database 224.

FIG. 5 is a diagram illustrating a depth map computed according to implementations of the present disclosure. Depth map generation module 216 can compute a depth map for the input image based on a feature-to-depth mapping function, such as feature-to-depth mapping function 400 determined by feature-to-depth mapping module 214. In the depth map 510 of FIG. 5, the shading is proportional to the distance of the surfaces of scene objects from the viewpoint in the source image 500. In this implementation, darker colors indicate a depth that is closer to the viewpoint, while lighter colors indicate a depth that is further away. In other implementations, the shading may be reversed.

Figure 6:
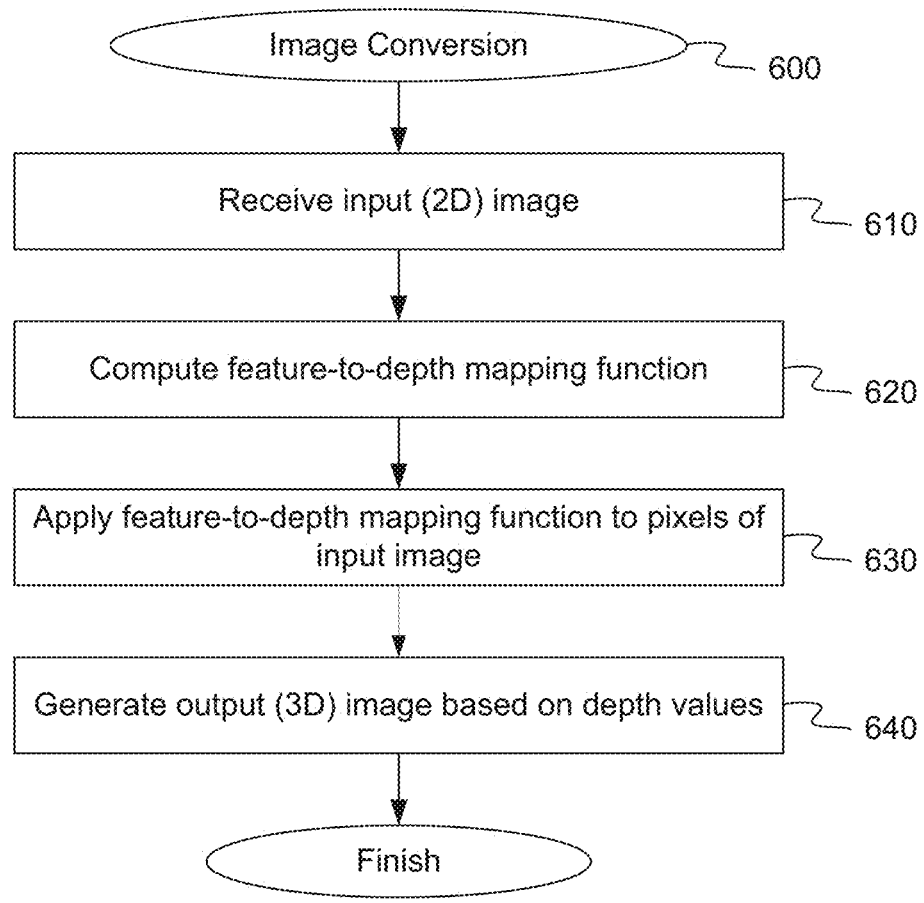
FIG. 6 is a flow diagram illustrating a method for image conversion, according to an implementation.

FIG. 6 is a flow diagram illustrating a method for image conversion according to an implementation of the present disclosure. The method 600 may be performed by processing logic that includes hardware (e.g., circuitry, dedicated logic, programmable logic, microcode, etc.), software (e.g., instructions run on a processing device to perform hardware simulation), or a combination thereof. The method 600 can generate a depth map for an input image using an approximate depth map associated with one or more example similar images. In one implementation, method 600 may be performed by image converter 110 as shown in FIG. 1.

Referring to FIG. 6, at block 610, method 600 receives a 2D input image for conversion to 3D. The input image may be received from a user (e.g., through a user interface provided by image converter 110), from another computer application program (e.g., through an application interface, such as an API), or from some other source.

At block 620, method 600 identifies (e.g., by computing or retrieving from storage) a feature-to-depth mapping function for the input image based on an approximate depth map associated with a similar 3D image. In one implementation, feature-to-depth mapping module 214 can aggregate the depth values for pixels of the same or similar feature (e.g., colors) in the example similar image, e.g., based on the assumption that objects in the image having the same or similar color will also have the same or similar depth value. The resulting function, such as function 400, can ultimately receive a color value (or other feature value) for a certain pixel or other point in the input image as an input and output a depth value for that pixel. The feature-to-depth mapping function may be stored, for example, in database 224.

At block 630, method 600 applies the feature-to-depth mapping function identified at block 620 to the pixels in the input image to determine a depth value for each of the pixels. Depth map generation module 216 can generate a resulting depth map for the input image. In one implementation, depth map generation module 216 can apply color values (or other appropriate feature values) as inputs to the feature-to-depth mapping function generated at block 620. This results in a depth value being calculated for each pixel of the input image. The depth values may be combined, based on the location of their associated pixels, to form a depth map 510 as shown in FIG. 5.

At block 640, method 600 generates a stereo pair for a 3D output image. In one implementation, image rendering module 218 can render a 3D output image based on the input image and the depth values calculated by depth map generation module 216 at block 630. In one implementation, rendering module 218 can use depth image based rendering (DIBR) techniques to generate the 3D image. In one implementation, the 3D output image includes a second image to be used in conjunction with the input image to form a stereo pair. The second image may be either the left image or the right image, depending on the implementation, and may be generated by image rendering module 218. The first and second images together may form the 3D output image. The 3D output image may be stored or displayed for viewing by a user.

Figure 7:
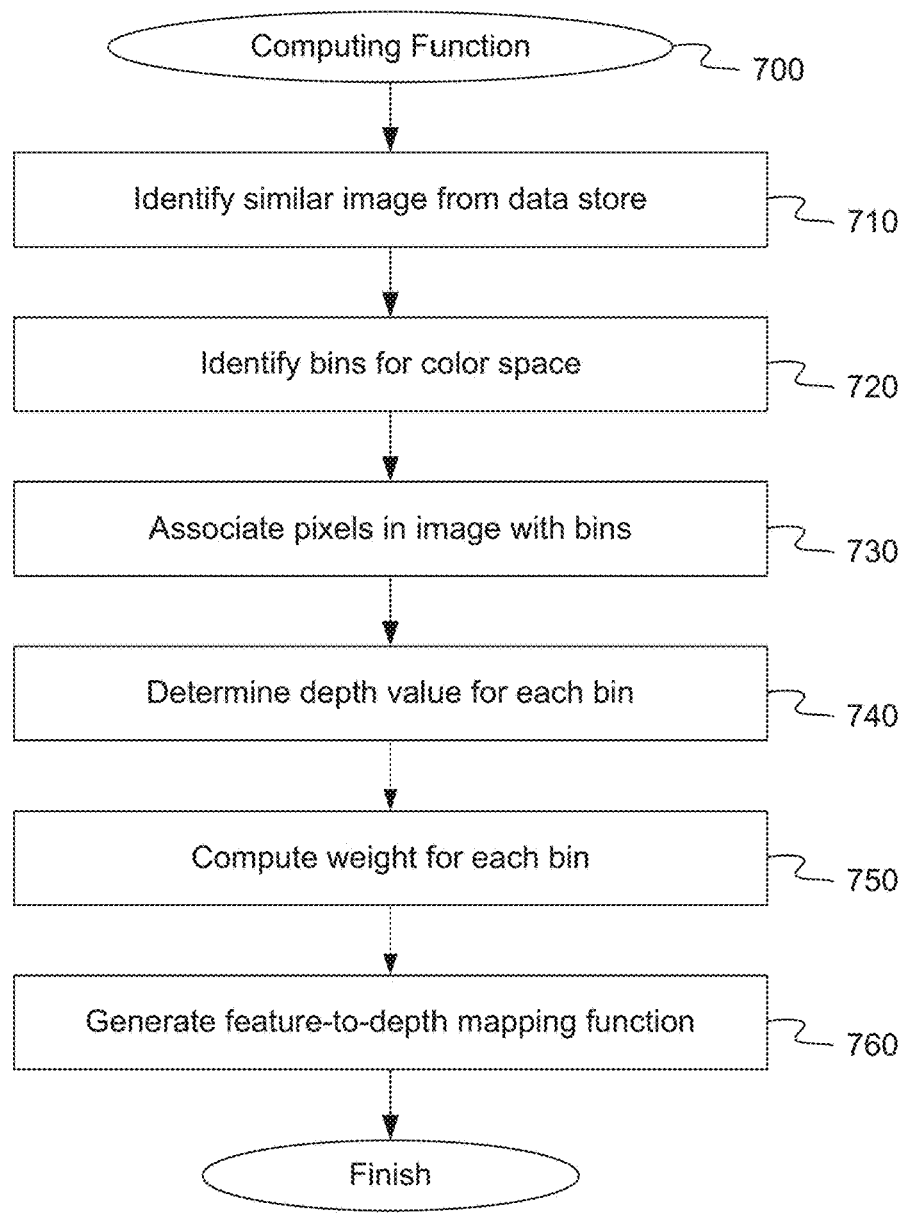
FIG. 7 is a flow diagram illustrating a method for computing a feature-to-depth mapping function, according to an implementation.

FIG. 7 is a flow diagram illustrating a method for computing a feature-to-depth mapping function according to an implementation of the present disclosure. The method 700 may be performed by processing logic that includes hardware (e.g., circuitry, dedicated logic, programmable logic, microcode, etc.), software (e.g., instructions run on a processing device to perform hardware simulation), or a combination thereof. The method 700 can create a feature-to-depth mapping function used to convert monoscopic visual content to stereoscopic 3D. In one implementation, method 700 may be performed by image converter 110 as shown in FIG. 1.

Referring to FIG. 7, at block 710, method 700 identifies one or more visually similar images from image data store 222. In one implementation, data store 222 may include a corpus of 3D images and/or videos for which feature information (e.g., color) and depth values are known. In one implementation, the corpus includes millions of images and/or videos. Any number of techniques may be used to identify the visually similar images, such as fingerprinting, K-nearest neighbor, etc. At block 720, method 700 identifies a number of bins to be used for the given color space. Binning may be used to reduce the number of colors taken into account. In one implementation where the color space is YCbCr, the space may be divided into bins on Y, Cb and Cr independently. In one implementation, the Y component is divided into 32 bins, and the Cb and Cr components are each divided into 16 bins, so that there are 8192 bins in total. In other implementations, some other number of bins and/or some other color space may be used.

At block 730, method 700 associates the pixels in the example similar image identified at block 710 with the bins identified at block 720. For the example image from image data store 222, feature handling module 212 can associate each pixel with an appropriate bin based on the color value of the pixel. Each bin may include pixels of the same or similar colors (or other relevant feature).

At block 740, method 700 determines a depth value for each color bin. For example, for each (Y, Cb, Cr) bin, there may be multiple depth values. In order to generate the feature-to-depth mapping function, only one depth value for each (Y, Cb, Cr) bin may be used. All the depth values in one bin may thus be combined into a single depth value. In one implementation, the combined depth value for the bin is simply the average of all the example depths that map to it. In another implementation, the combined depth is the median of all the example depths that map to it. In yet another implementation, a RANSAC (Random Sample Consensus) method is used to detect outliers in the depth values and the mean of the inliers is output. Assuming the total number of depth values is N, for each iteration of RANSAC, a random subset (N1) of the depth values is chosen and its mean is computed. The difference between this mean depth and all the N depth values is computed. Those with a difference smaller than a threshold may be included in an inlier set. The iteration may stop when the inlier set does not change or a max iteration number is reached. If the inlier set size is bigger than M (which may be specified as a percentage of N), this inlier set is claimed as valid, and its mean may be used as a summarization of all the depth values.

At block 750, method 700 computes a weight value for each bin. Feature handing module 212 can compute a weight for each bin that is a function of the ratio of the occupancy within the bin and the average occupancy for any bin. So if there are N pixels in the example image, and a total of B bins, then the occupancy ratio of a bin with n hits is n/(BN). The weight for each bin may be a function of this occupancy ratio, i.e., w(n/(BN)). In one implementation, the function is w(x)=1−exp(−kx), where k is chosen such that w(x) is small for small occupancy ratios, but quickly gets close to one for non-trivial occupancies. In another implementation, the weighting function w(x) equals 0 for x<a small value, and equals one otherwise, in order to reject bins with very small occupancy which may be due to noise.

At block 760, method 700 generates the feature-to-depth mapping function. Feature-to-depth mapping module 214 can perform a form of polynomial fit (e.g., curve fitting) to generate the feature-to-depth mapping function 400. The resulting function may be expressed as f(color)=depth, or in the case of YUV color, f(YUV)=depth. Thus, the depth value for a given pixel is computed as a function of the YUV color values for that pixel. Feature-to-depth mapping module 214 can also smooth the mapping function. Since the mapping function may be noisy, module 214 can smooth the mapping function by convolving it with a predefined smoothing kernel. For example, a bin, j, may be reassigned with a weighted average of its neighboring bins where the weight is the product of the smoothing kernel with the occupancy based weight computed above at block 750. In one implementation, the final depth (D) for this bin, j, may be computed as:

$$D'j = \frac{\sum_{i \in N(j)} D_i w_i}{\sum_{i \in N(j)} w_i}$$

In this equation, N(j) denotes the neighborhood of the bin. The feature-to-depth mapping function may be stored, for example, in a data store such as database 224.

Figure 8A:
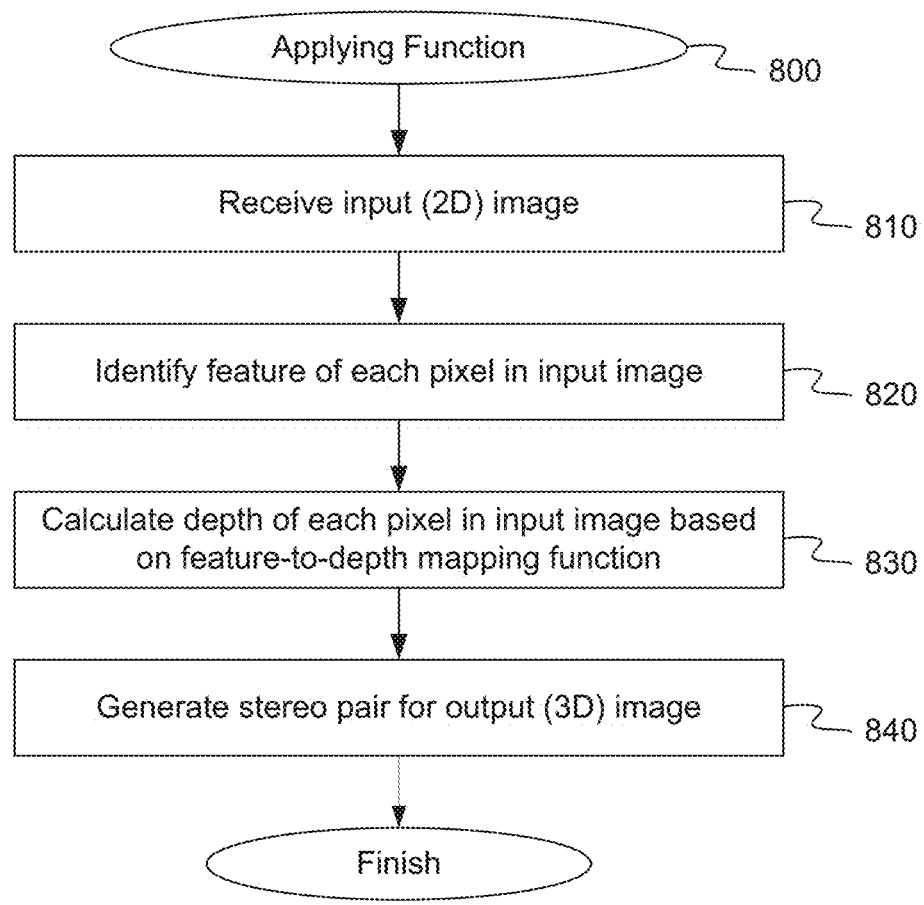
FIG. 8A is a flow diagram illustrating a method for applying a feature-to-depth mapping function to an input image, according to an implementation.

FIG. 8A is a flow diagram illustrating a method for applying a feature-to-depth mapping function to an input image, according to an implementation of the present disclosure. The method 800 may be performed by processing logic that includes hardware (e.g., circuitry, dedicated logic, programmable logic, microcode, etc.), software (e.g., instructions run on a processing device to perform hardware simulation), or a combination thereof. The method 800 can apply a feature-to-depth mapping function to an input image to convert the input image to stereoscopic 3D. In one implementation, method 800 may be performed by image converter 110 as shown in FIG. 1.

Referring to FIG. 8A, at block 810, method 800 receives a 2D input image to be converted to 3D. At block 820, method 800 identifies the feature (e.g., color value) of each pixel in the input image. In one implementation the feature data may be stored in metadata associated with the image, and feature handling module 212 can determine the feature value, e.g., color value, from this metadata.

At block 830, method 800 calculates the depth of each pixel in the input image based on the feature-to-depth mapping function determined from the approximate depth map (e.g., as discussed above in conjunction with FIG. 7). In one implementation, depth map generation module 216 can perform an n-linear interpolation in the feature space to get a depth of the query pixel. For example, in a one-dimensional case, the two bin centers surrounding the actual value of the query pixel may be denoted as C1 and C2. The weighted depth values of those bins may be D1 and D2, respectively. Depth map generation module 216 can compute the distances between the query pixel and C1 and C2, and denote them by d1 and d2 respectively. Depth map generation module 216 can use the distances as weights to interpolate a depth value between these two bins using a formula such as:

$$D = \frac{d2D1 + d1D2}{d1 + d2}$$

Figure 8B:
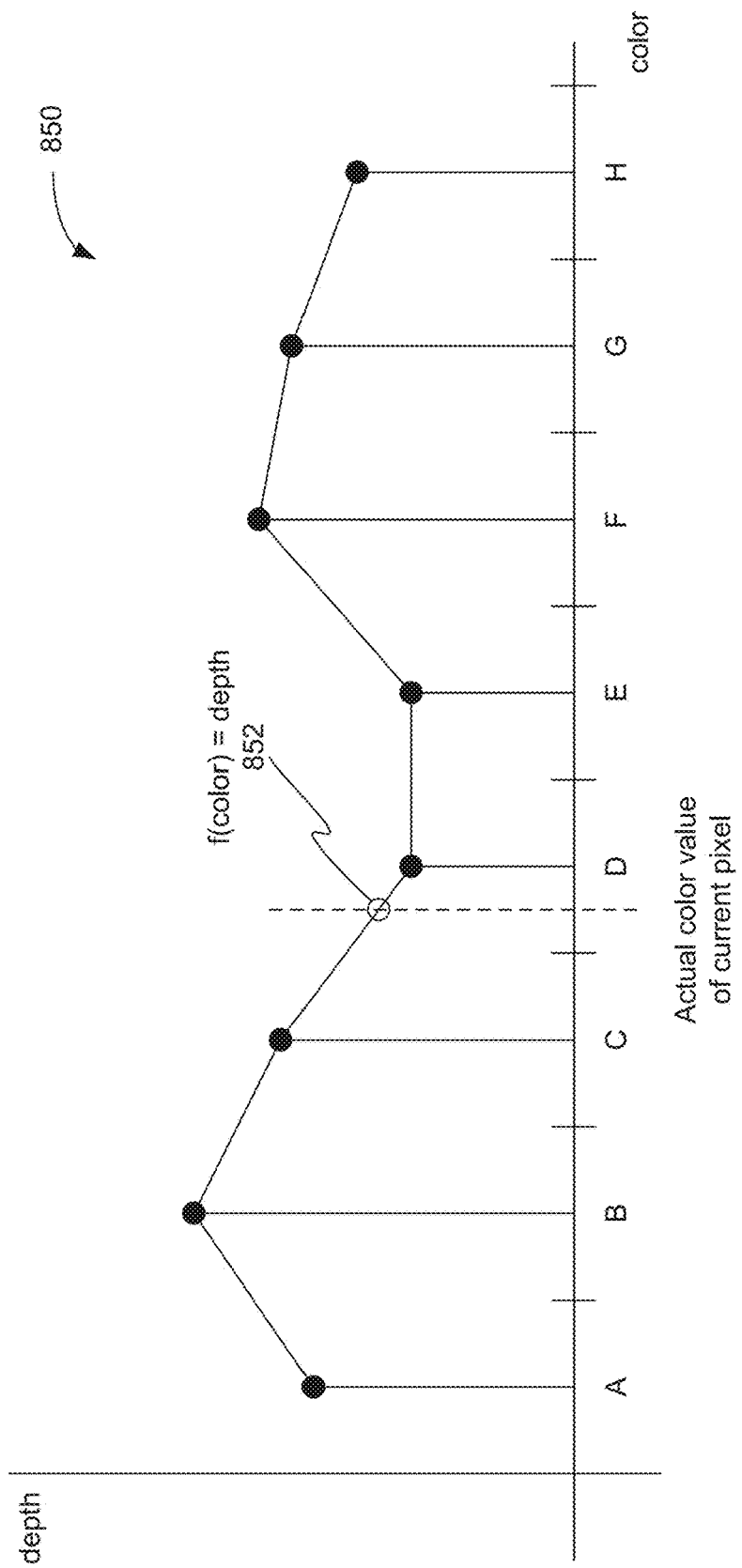
FIG. 8B is a diagram illustrating a one-dimensional linear interpolation between color-depth bins, according to an implementation.

FIG. 8B is a diagram illustrating a one-dimensional linear interpolation between color-depth bins, according to an implementation. An interpolated value 852 may be returned as the depth value for the query pixel. Using a histogram representation of the feature-to-depth mapping 850, the approximated mapping is not smooth. Depth value may change abruptly near bin boundaries. In one implementation, interpolation may be used on the approximated mapping. In one implementation, a trilinear interpolation of the mapping may be used, since we have a 3D mapping function f(y, u, v)=d. Since features tend to follow object contours in the image, with this method a good segmentation in the depth-map that follows object boundaries may be achieved.

Referring again to FIG. 8A, at block 840, method 800 generates a stereo pair for a 3D output image. In one implementation, image rendering module 218 can render a 3D output image based on the input image and the depth values calculated by depth map generation module 216 at block 830. In one implementation, rendering module 218 can use depth image based rendering (DIBR) techniques to generate the 3D image. The output image may be stored or displayed for viewing by a user.

Figure 9:
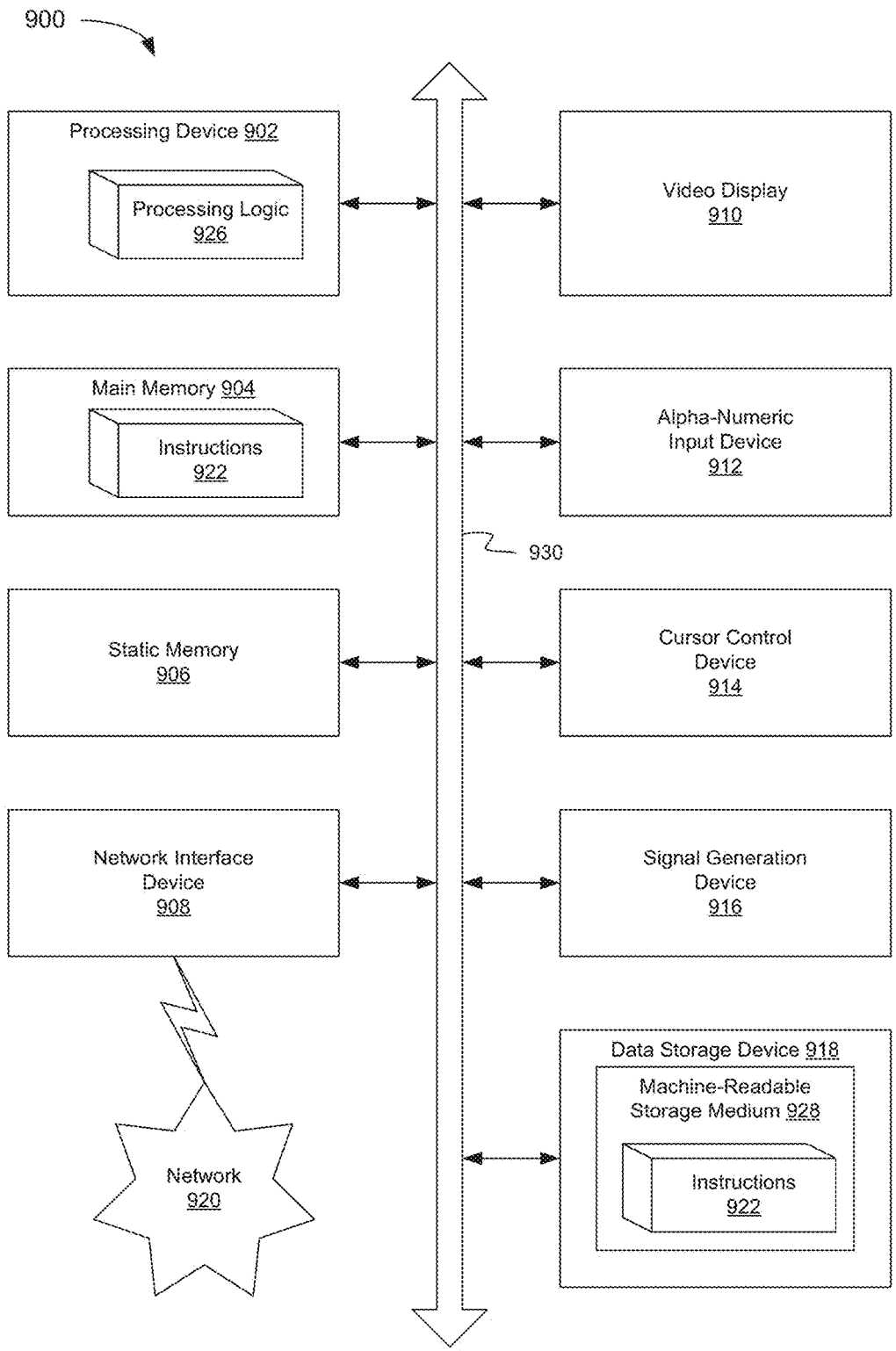
FIG. 9 is a block diagram illustrating one implementation of a computer system, in accordance with an aspect of this disclosure.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 900 may be representative of a server, such as server 102, running image converter 110.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium 928, on which is stored one or more set of instructions 922 (e.g., software) embodying any one or more of the methodologies of functions described herein. The instructions 922 may also reside, completely or at least partially, within the main memory 904 and/or within the processing device 902 during execution thereof by the computer system 900; the main memory 904 and the processing device 902 also constituting machine-readable storage media. The instructions 922 may further be transmitted or received over a network 920 via the network interface device 908.

The machine-readable storage medium 928 may also be used to store instructions to perform a method for generating a depth map for an input image using an example approximate depth-map associated with an example similar image, as described herein. While the machine-readable storage medium 928 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several aspects of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner. Furthermore, not all illustrated acts may be required to implement aspects of the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

What is claimed is:

1. A method comprising:
   receiving a two-dimensional image to be converted to a first three-dimensional image;
   identifying a second three-dimensional image that is visually similar to the two-dimensional image that is to be converted, the second three-dimensional image sharing a threshold number of color features with the two-dimensional image;
   identifying an approximate depth map of the second three-dimensional image that shares the threshold number of color features with the two-dimensional image;
   identifying a distribution of spatial variation of the second three-dimensional image;
   computing, by a processing device, a plurality of feature-to-depth mapping functions for the first three-dimensional image by using the approximate depth map of the second three-dimensional image that shares the threshold number of color features with the two-dimensional image, wherein a number of the plurality of feature-to-depth mapping functions that are computed is based on the distribution of the spatial variation of the second three-dimensional image;
   applying the plurality of feature-to-depth mapping functions to a plurality of pixels of the two-dimensional image to determine depth values for the plurality of pixels of the two-dimensional image, wherein the plurality of feature-to-depth mapping functions determine the depth values for the plurality of pixels of the two-dimensional image based on a color value of each of the plurality of pixels; and generating the first three-dimensional image based on the depth values for the plurality of pixels of the two-dimensional image.

2. The method of claim 1, further comprising:

dividing the second three-dimensional image into a plurality of regions, wherein each of the plurality of feature-to-depth mapping functions is associated with a different region of the plurality of regions of the second three-dimensional image.

3. The method of claim 2, wherein the determination of the depth values is based on an interpolation of depth values associated with the plurality of feature-to-depth mapping functions for each of the different regions of the plurality of regions of the second three-dimensional image.

4. The method of claim 1, wherein applying the plurality of feature-to-depth mappings function comprises:

identifying a feature of each of the plurality of pixels of the two-dimensional image; and calculating a corresponding depth value for each of the plurality of pixels of the two-dimensional image, wherein calculating the depth value for each of the plurality of pixels comprises computing a linear interpolation based on the calculated depth values for each of the plurality of pixels of the two-dimensional image.

5. The method of claim 1, wherein the plurality of feature-to-depth mapping functions are based on a color space.

6. The method of claim 5, wherein the color space is Y-Cb-Cr.

7. The method of claim 1, wherein each of the plurality of feature-to-depth mapping functions is associated with a different region of the first three-dimensional image.

8. A system comprising:

a memory; and a processing device, operatively coupled with the memory, to:

receive a two-dimensional image to be converted to a first three-dimensional image;

identify a second three-dimensional image that is visually similar to the two-dimensional image that is to be converted, the second three-dimensional image sharing a threshold number of color features with the two-dimensional image;

identify an approximate depth map of the second three-dimensional image that shares the threshold number of color features with the two-dimensional image;

identify a distribution of spatial variation of the second three-dimensional image;

compute a plurality of feature-to-depth mapping functions for the first three-dimensional image by using the approximate depth map of the second three-dimensional image that shares the threshold number of color features with the two-dimensional image, wherein a number of the plurality of feature-to-depth mapping functions that are computed is based on the distribution of the spatial variation of the second three-dimensional image;

apply plurality of feature-to-depth mapping functions to a plurality of pixels of the two-dimensional image to determine depth values for the plurality of pixels of the two-dimensional image, wherein plurality of feature-to-depth mapping functions determine the depth values for the plurality of pixels of the two-dimensional image based on a color value of each of the plurality of pixels; and generate the first three-dimensional image based on the depth values for the plurality of pixels of the two-dimensional image.

9. The system of claim 8, wherein the processing device is further to:

divide the second three-dimensional image into a plurality of regions, wherein each of the plurality of feature-to-depth mapping functions is associated with a different region of the plurality of regions of the second three-dimensional image.

10. The system of claim 9, wherein the determination of the depth values is based on an interpolation of depth values associated with the plurality of feature-to-depth mapping functions for each of the different regions of the plurality of regions of the second three-dimensional image.

11. The system of claim 8, wherein to apply the plurality of feature-to-depth mappings, the processing device is further to:

identify a feature of each of the plurality of pixels of the two-dimensional image; and calculate a corresponding depth value for each of the plurality of pixels of the two-dimensional image, wherein calculating the depth value for each of the plurality of pixels comprises computing a linear interpolation based on the calculated depth values for each of the plurality of pixels of the two-dimensional image.

12. The system of claim 8, wherein the plurality of feature-to-depth mappings are based on a color space.

13. The system of claim 12, wherein the color space is Y-Cb-Cr.

14. A non-transitory machine-readable storage medium storing instructions which, when executed by a processing device, cause the processing device to perform operations comprising:

receiving a two-dimensional image to be converted to a first three-dimensional image;

identifying a second three-dimensional image that is visually similar to the two-dimensional image that is to be converted, the second three-dimensional image sharing a threshold number of color features with the two-dimensional image;

identifying an approximate depth map of the second three-dimensional image that shares the threshold number of color features with the two-dimensional image;

identifying a distribution of spatial variation of the second three-dimensional image;

computing a plurality of feature-to-depth mapping functions for the first three-dimensional image by using the approximate depth map of the second three-dimensional image that shares the threshold number of color features with the two-dimensional image, wherein a number of the plurality of feature-to-depth mapping functions that are computed is based on the distribution of the spatial variation of the second three-dimensional image;

applying the plurality of feature-to-depth mapping functions to a plurality of pixels of the two-dimensional image to determine depth values for the plurality of pixels of the two-dimensional image, wherein the plurality of feature-to-depth mapping functions determine the depth values for the plurality of pixels of the two-dimensional image based on a color value of each of the plurality of pixels; and generating the first three-dimensional image based on the depth values for the plurality of pixels of the two-dimensional image.

15. The non-transitory machine-readable storage medium of claim 14, the operations further comprising:
dividing the second three-dimensional image into a plurality of regions, wherein each of the plurality of feature-to-depth mapping functions is associated with a different region of the plurality of regions of the second three-dimensional image.

16. The non-transitory machine-readable storage medium of claim 15, wherein the determination of the depth values is based on an interpolation of depth values associated with the plurality of feature-to-depth mapping functions for each of the different regions of the plurality of regions of the second three-dimensional image.

17. The non-transitory machine-readable storage medium of claim 14, wherein to apply the plurality of feature-to-depth mappings, the operations further comprise:
identifying a feature of each of the plurality of pixels of the two-dimensional image; and
calculating a corresponding depth value for each of the plurality of pixels of the two-dimensional image, wherein calculating the depth value for each of the plurality of pixels comprises computing a linear interpolation based on the calculated depth values for each of the plurality of pixels of the two-dimensional image.

18. The non-transitory machine-readable storage medium of claim 14, wherein the plurality of feature-to-depth mappings are based on a color space.

* * * * *